Nov. 24, 1953     O. L. GUESTINGER     2,659,997

HOOK AND LEADER HOLDER

Filed Sept. 18, 1950

Oscar L. Guestinger
INVENTOR.

BY *Clarence A. O'Brien*
and *Harvey B. Jackson*
Attorneys

Patented Nov. 24, 1953

2,659,997

UNITED STATES PATENT OFFICE 2,659,997

HOOK AND LEADER HOLDER

Oscar L. Guestinger, Roff, Okla.

Application September 18, 1950, Serial No. 185,348

1 Claim. (Cl. 43—57.5)

This invention relates to improvements in fisherman's articles.

An object of this invention is to provide an improved device for holding fish hooks which have leaders attached thereto in an orderly, neat and safe assembly.

Other objects and features of importance will become apparent in following the description of the illustrated form of the invention.

Figure 1:
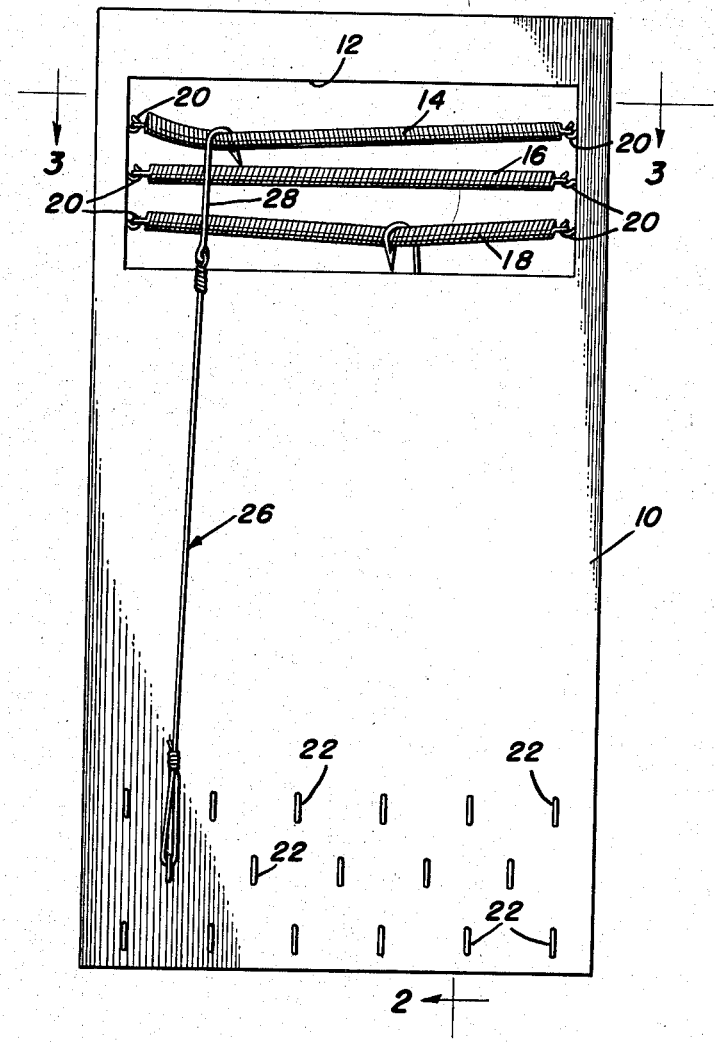
Figure 1 is a plan view of the device.
Figure 2:
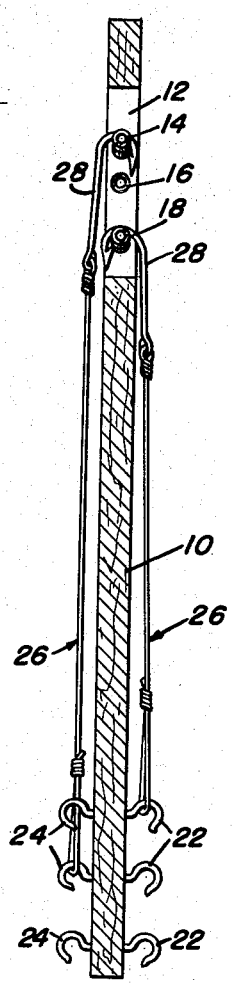
Figure 2 is a longitudinal sectional view taken substantially on the line 2—2 of Figure 1 and in the direction of the arrows.
Figure 3:
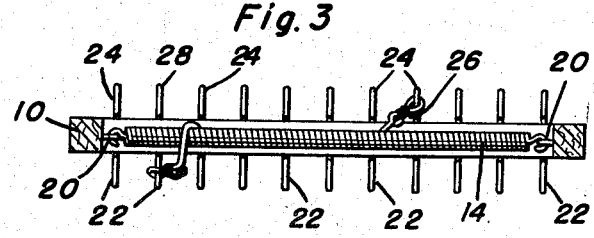
Figure 3 is a transverse sectional view taken substantially on the line 3—3 of Figure 1 and in the directions of the arrows.

In carrying out this invention there is provided a flat panel 10, preferably of buoyant material, for example wood, which has an aperture 12 near one end thereof which passes entirely through the panel. The springs 14, 16 and 18 respectively extend transversely across the aperture 12 and are fastened to the panel at opposite sides of said aperture. These springs are attached at their ends by means of standard retaining hooks 20 which are simply threaded in the material of the panel.

A plurality of anchoring hooks 22, preferably standard hooks, are fastened to the panel 10 and rise from one surface thereof. A plurality of anchoring hooks 24 are attached to the panel 10 and on the opposite surface thereof, the hooks 24 and 22 being arranged to hold the looped ends of fishing leaders generally indicated at 26. These leaders have conventional fishing hooks 28 at the ends thereof which are adapted to be held by the springs 14, 16 and 18.

In operation the fishing leader has the looped end arranged around one of the anchoring hooks 22 or 24 and the fish hook 28 thereon is arranged over one of the springs. The springs are normally retained in spaced relationship and are parallel to each other. When the hook of the leader is disposed on one of the springs, an anchoring hook 22 or 24 is selected which will tension the leader a small amount so as to stretch the spring chosen to hold the fish hook 28, thereby yieldingly holding the fish hook and leader to the base.

Inasmuch as the base is preferably made of buoyant material, in the event of accidental loss in the water, the entire device will float so that it may be rather easily recovered.

Having described the invention, what is claimed as new is:

A holder and carrier for a plurality of snells comprising a solid flat faced panel of buoyant material, said panel being rectangular and having an imperforate body portion and being provided at one end only with a transversely disposed relatively small rectangular opening, readily attachable and removable screw hooks arranged within the marginal confines of said opening and secured to the transverse marginal edge portion of said opening, a plurality of spaced parallel coil springs also arranged within the marginal confines of said opening and having their end portions secured detachably to their respective attaching and retaining screw hooks, the cross-sectional thickness of said panel being greater than the cross-sections of said coil springs, and selectively usable anchoring hooks detachably mounted on opposite sides of the panel at the end of the panel opposite to that end portion having said opening, said anchoring hooks being in staggered relation with respect to each other and permitting the snells to be applied and carried on both sides of the panel by engaging the fish hooks over selected coil springs and by attaching the usual lead line loops to selected anchoring hooks.

OSCAR L. GUESTINGER.

References Cited in the file of this patent

UNITED STATES PATENTS

| Number | Name | Date |
|---|---|---|
| 566,595 | Magnuson | Aug. 25, 1896 |
| 1,231,165 | Jay | June 26, 1917 |
| 1,669,928 | Case | May 15, 1928 |
| 1,736,337 | Borel | Nov. 19, 1929 |
| 1,737,376 | Knettles | Nov. 26, 1929 |
| 2,069,661 | Tiede | Feb. 2, 1937 |
| 2,130,112 | Woolen | Sept. 13, 1938 |
| 2,493,344 | Hamel | Jan. 3, 1950 |